INVENTOR.
DONALD G. O'BRIEN
BY Kenway Jenney & Hildreth

ATTORNEYS

INVENTOR.
DONALD G. O'BRIEN

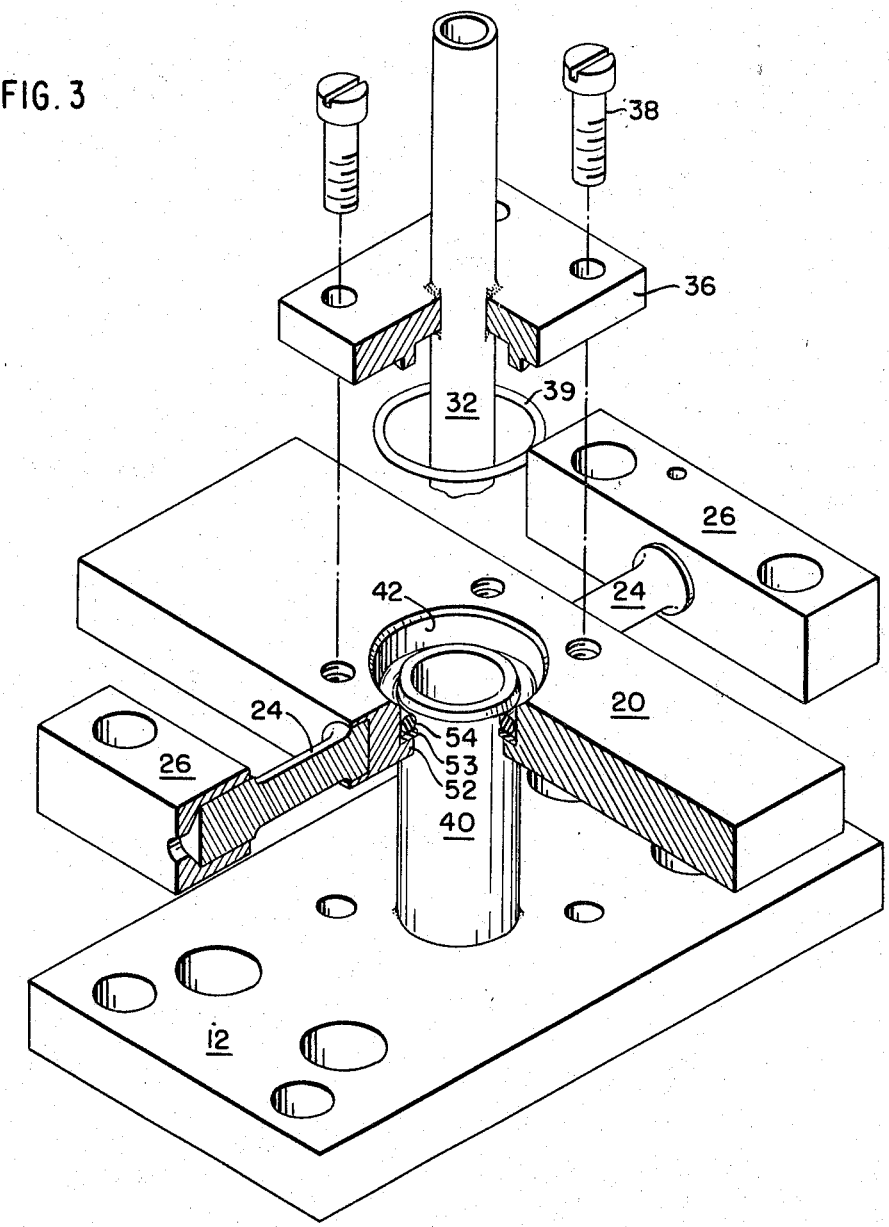

United States Patent Office 3,323,090
Patented May 30, 1967

3,323,090
FLUID SEAL FOR A TORQUE MOTOR
Donald G. O'Brien, Cochituate, Mass., assignor to D. G. O'Brien, Inc., Natick, Mass., a corporation of Massachusetts
Filed June 4, 1964, Ser. No. 372,475
9 Claims. (Cl. 335—230)

The present invention relates to electromagnetic actuators commonly termed torque motors, such as are employed for the translation of electrical signals into mechanical forces or displacements for the control of fluid-powered devices, for example servo systems.

Torque motors of the type with which the present invention is concerned are disclosed in United States Patents Nos. 2,718,614 issued Sept. 20, 1955; 2,891,181 issued June 16, 1959, and 2,962,611 issued Nov. 29, 1960. In general, these devices employ an elongated armature mounted for limited rocking movement under the influence of electrical signals applied to the control coils associated with the fixed pole pieces of the device. The pole pieces define air gaps between which the ends of the armature are disposed, with permanent magnets to provide a polarizing flux acros the gaps so that the direction and extent of armature movement are a function of the direction and magnitude of the current in the control coils.

Torque motors, by reason of their usual function as an electromechanical transducer in control systems, are generally required to provide maximum sensitivity consistent with linearity of response. This means that the armature must be precisely supported for rocking about a predetermined axis, yet the pivotal support must be free of friction, especially "dry" friction or other constraint tending to diminish the precision of the null (no-signal) position, and the restoring torque should be essentially linear.

The attainment of the foregoing requirements is complicated by reason of the need for transmitting the motion of the armature to the device or component to be actuated, such as a pneumatic or hydraulic valve. It is obviously desirable to dispose the torque motor and the fluid valve actuated thereby in close association, which means that the torque motor must be protected from the fluid environment within which the control components of fluid-powered systems generally operate. As a consequence, many attempts have been made to provide a sealed construction for torque motors which will permit the output to be transmitted to a control element external to the motor, while preventing the fluid from entering the coil and pole-piece region of the motor, within which the armature operates. Prior devices have utilized metallic tubes surrounding the output member or shaft, with one end of the tube secured to the armature or its rotating support and the other end secured to the frame. Such constructions require that the tube itself either bend or twist to permit movement of the armature under the influence of the electrical signals. In such arrangements, the stiffness of the tube adversely affects the sensitivity of the response, while a reduction in wall thickness of the tube to improve compliance may alter the transducer performance because of distortion of the tube under the fluid pressure.

It is therefore an object of the invention to provide an improved seal construction for torque motors and the like, capable of effectively excluding fluid from the interior or the torque motor without impairing the sensitivity or the linearity of the response.

Still another object of the invention is to provide a seal construction such that the linearity and sensitivity of the torque motor are substantially unaffected by variations in the fluid pressure to which the motor is exposed, even up to the highest pressure which may be encountered in high-performance servo and open-loop control systems.

More specifically, it is an object of the invention to provide a resilient-seal construction which permits a non-rigid connection to the movable assembly in a region where relative motion between the movable and the fixed surfaces is a minimum.

As will more fully appear from the description which follows and from the accompanying drawings, a feature of the invention involves a torque-motor construction wherein the seal by which fluid is excluded is disposed within the motor closely adjacent the pivotal axis about which the armature rocks so that the gap bridged by the resilient material of the seal may be narrow.

In the drawings illustrating the invention,

FIG. 3 is an oblique detail view, partly exploded and partly broken away, showing the parts in the region of the fluid seal at the armature.

Figure 1:
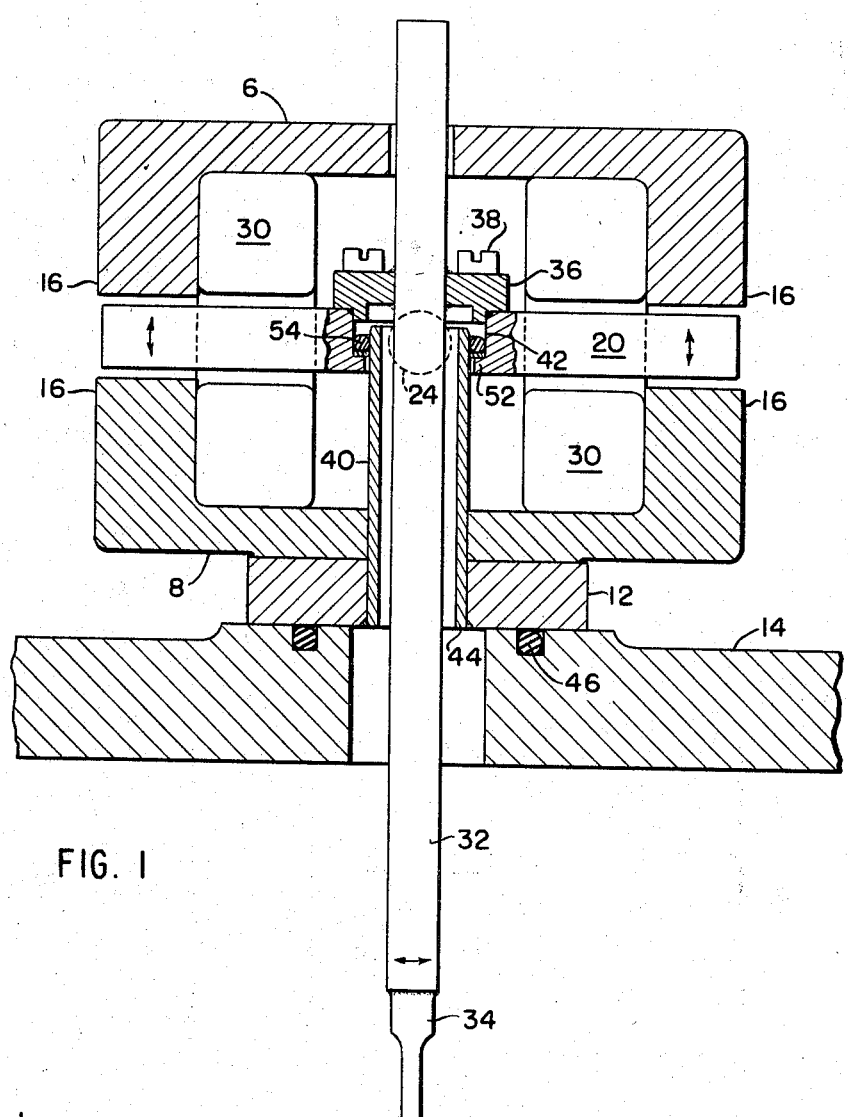
FIG. 1 is a view of a torque motor in sectional elevation taken on a section through the center of the device in a plane perpendicular to the pivotal supporting axis for the armature.
Figure 1A:
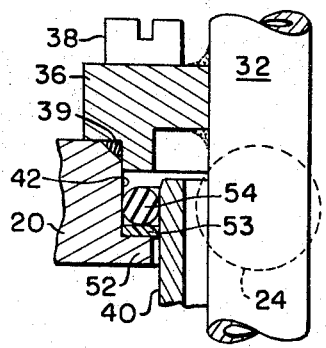
FIG. 1a is a detail of the seal portion of FIG. 1 showing the arrangement and construction of the seal.
Figure 2:
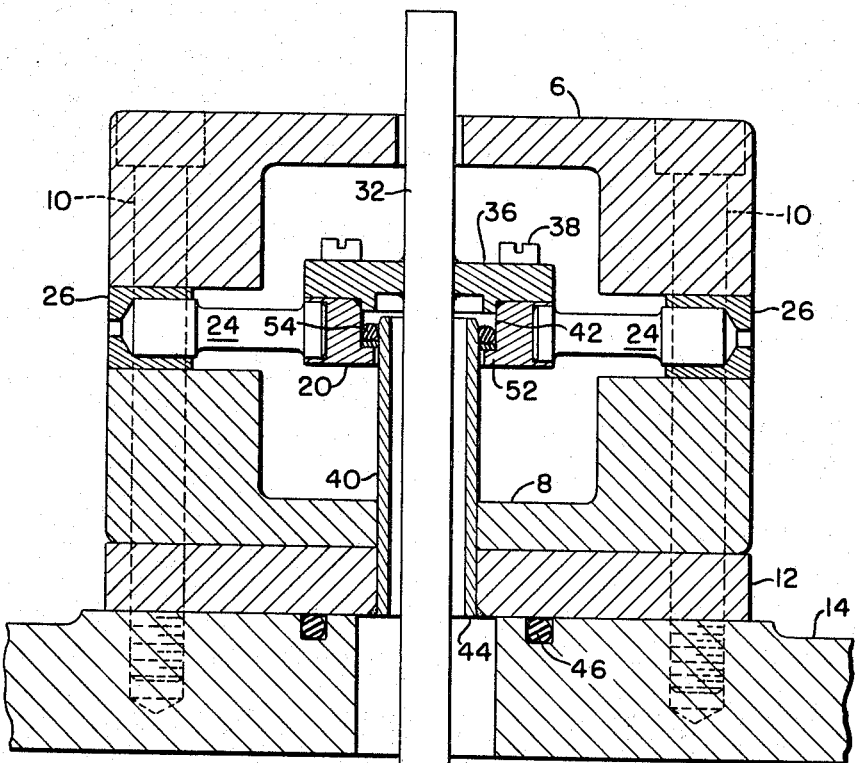
FIG. 2 is a view in sectional elevation taken on a section through the center of the device in a plane through the pivotal supporting axis of the armature and therefore corresponding to a view at ninety degrees to the section of FIG. 1.

Referring to FIGS. 1, 1a and 2 of the drawings, the torque motor comprises a split housing having upper and lower frame members 6 and 8 secured in assembled relation by bolts 10 extending through base plate 12 into a support 14. The ends of the frame members, as seen in FIG. 1, constitute opposing pole pieces 16 having spaced faces which define the working air gaps. Permanent magnets, not shown, are mounted in conventional relation to the pole structure to provide the usual polarizing flux across the gaps.

The armature 20 of the torque motor has its ends disposed within the air gaps formed by the pole pieces 16. The armature, of generally rectangular configuration, is mounted for limited rocking movement about an axis extending transversely through its center. Instead of rotatable bearings for supporting the armature, torsion shafts 24 are employed. The inner ends are secured in sockets in the armature, while the outer ends are secured in blocks 26 which are clamped between the upper and lower pole pieces when bolts 10 are tightened. The intermediate portions of the shafts are reduced in diameter to provide the desired torque-displacement characteristics. The shafts 24 and the blocks 26 are of non-magnetic material such as non-magnetic stainless steel to prevent short circuiting the magnetic flux.

The motion of the armature, in response to an electrical signal applied to the control coils 30, is transmitted to the exterior of the actuator by means of an output member 32 secured to and extending from the armature in a direction perpendicular to its rocking axis. The output tube thus forms an element of the armature assembly supported on torsion members 24, with the outer end 34 of the output member moving in an arcuate path as the armature is rocked by the input signal, and such movement may be utilized in conventional manner to actuate the pilot valve of a hydraulic of pneumatic amplifier, for example.

To provide a demountable connection between output member 32 and the armature 20, the member 32 is secured, as by brazing, to a cap or cover piece 36 which in turn is attached to the center of the armature by machine screws 38. A gasket 39 seals the joint between the cover piece and armature as shown in FIG. 1a. If a demountable connection is not required, the cover piece may be secured to the armature by brazing, and the securing screws and gasket omitted. The cover piece 36 is preferably of a material having the same magnetic properties as the armature 20, so as to provide a supplemental flux-conductive path between the ends of the armature in compensation for the material removed at the center of the armature to accommodate the seal construction to be described.

To enable the seal to be located close to the axis of the armature assembly, a tube 40 surrounding the output member 32 extends from the base 12 inwardly into a bore or recess 42 in the armature. The tube is of sufficient size to provide clearance for the output member over its normal range of swinging movement. The outer end 44 of the tube is secured to the base by brazing or other means which affords a fluid-tight connection, with an O-ring seal 46 for the joint between base 12 and support 14.

The circular recess 42 in the armature is of greater diameter than the output member 32 and is formed with a shoulder 52 extending into closely-spaced relation to the seal tube 40, only slight clearance being needed to avoid contact with the tube during rocking movement of the armature. The shoulder serves as a seat for a back-up ring 53 for the sealing ring of elastomeric material 54 disposed within the annular gap between the tube 40 and the walls of recess 42 in the armature. The back-up ring, which may be of Teflon, is to prevent extrusion of the resilient sealing ring into the gap between the shoulder 52 and the tube 40 under high fluid pressure. As a result of this resilient-seal construction, fluid which fills the interior of the tube 40 from the chamber into which output member extends, is effectively prevented from escaping downwardly along the outside of tube 40 into the coil and pole piece region of the motor, while readily accommodating slight rocking movement of the armature assembly relative to the fixed tube 40. Upward flow of fluid from the open end of tube 40 into the torque motor is prevented by the armature cover 36, sealed by gasket or brazing as previously described.

The disposition of the flexible seal member between the rigid seal tube and the closely adjacent surface of the movable armature assembly in a region close to the pivotal axis of the armature and in a plane parallel to said axis, makes possible a fluid-tight seal that has no significant effect on the sensitivity or linearity of the torque-motor performance. The seal is capable of withstanding extremely high fluid pressures, of the order of several thousand pounds per square inch, because the O-ring element is effectively supported in the annular recess between armature seal tube 40, with very little clearance needed between the relatively movable parts to accommodate the rocking of the armature.

It will be observed that the seal lies in a plane parallel to the pivotal axis of the armature, rather than in a plane perpendicular to the rotational axis. Since the armature rocks through only a few degrees in either direction from its null position, little if any slippage need take place between the seal surface and the tube, even in the diametrically-opposed regions furtherest romoved from the rock axis. It is believed that most, if not all, of the relative motion is taken up within the material of the O-ring itself. That this is in fact the case is indicated by the precision of the null position of the armature and output member upon return from displacement in one direction, as compared with its position upon return from displacement in the other direction.

Because of the resilient seal between the armature assembly and the seal tube, the tube itself provides no restraint on armature movement and may therefore be made strong enough readily to resist the highest pressures likely to be employed. On the other hand, should there be any distortion or displacement of the tube by reason of pressure variations, these changes will not be transmitted to the armature but will be taken up by the resilience of the seal material.

Figure 4:
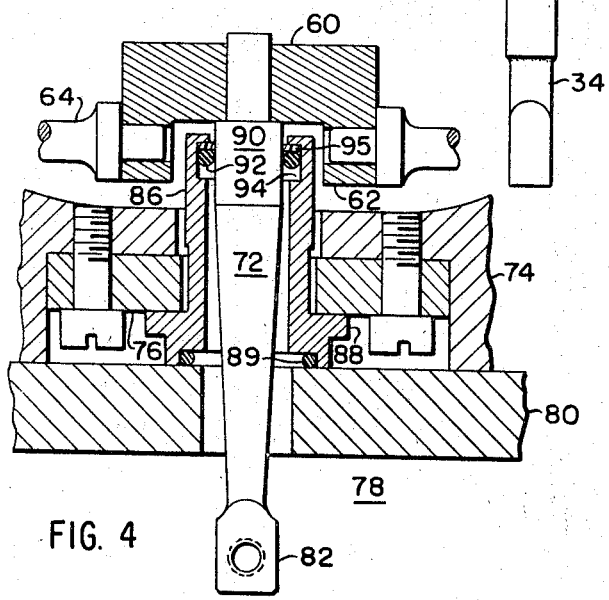
FIG. 4 is a detail view in sectional elevation, partly broken away, showing an alternative form of fluid seal construction, the view being taken in a plane through the supporting axis of the armature.

An alternative form of resilient-seal construction is illustrated in FIG. 4. In this detail view, only portions of the frame and pole piece structure are shown. The armature 60 is of one-piece construction, having integral depending bosses 62 within which are secured the ends of support shafts 64. The outer ends of these shafts are secured in mounting blocks similar to those indicated at 26 in FIGS. 1 and 2. The intermediate portions of the shafts are of reduced diameter and define the torsional-deflection region of the armature suspension.

The output member 72 is secured, as by brazing or soldering at the center of the armature so as to form a rigid integral portion of the armature assembly. The output member extends through registering apertures in frame 74 and lower pole piece 76 into a chamber 78 defined in part by wall 80 on which the torque motor is shown as mounted. The chamber may contain a fluid valve or other instrumentality, not shown, to be actuated by the arcuate movement of the outer end 82 of the output member 72.

As in the first-described embodiment, a rigid tube surrounds the output member and extends from a fixed portion of the torque-motor structure into closely spaced relation to the movable armature assembly in a region approximately at the suspension axis for the armature. The seal tube comprises a cylindrical portion 86 with a flange 88 by which the tube may be secured to the lower pole piece 76 by suitable means as by machine screws, not shown, through regions where the flange may be widened for this purpose. The outer end of the flange portion 88 of the tube is provided with a concentric recess to receive an O-ring seal 89 to form a fluid-tight joint between the outer end of the seal tube and the surface of the wall 80 when the torque motor is mounted on said wall. Clearance is provided between the cylindrical portion of the tube and the walls of the apertures in frame 74 and lower pole piece 76 to permit the seal tube to be positioned in accurate concentric relation to the enlarged portion 90 of the output member adjacent the underside of the armature 60.

In this embodiment of the invention the resilient seal 92 is positioned in a plane slightly displaced from but still close to the suspension axis for the armature, in contrast to the disposition of the seal 54 in FIGS. 1, 1a and 2 where the seal is shown disposed in a plane almost exactly on-axis with the suspension. An annular groove 94 is formed around the interior of the seal tube 80 close to its upper end, with a back-up ring 95 of Teflon or other suitable material disposed in contact with the underside of the inward shoulder at the extreme end of the tube to prevent the extrusion of the resilient seal ring 92 into the gap between the seal tube 86 and output member 90 under the influence of fluid pressure from the chamber 78.

While the invention has been described in terms of a preferred and an alternative embodiment thereof, it will be understood that the concept of a resilient fluid seal for torque motors, located at or close to the armature and preferably on or close to the rock axis thereof, may be embodied in other constructions and arrangements within the scope of the appended claims.

I claim:

1. A fluid-seal construction for a torque motor having a frame, an armature and an output member secured to said armature, said armature and output member being supported in said frame for limited rocking movement about a predetermined axis, said fluid seal construction comprising, in combination, a seal-tube surrounding the output member, and in closely-spaced relation thereto, means forming a recess in said armature on said support axis, one end of said seal tube extending into the recess in said armature, and being in closely-spaced relation thereto, and resilient sealing means located within the recess in said armature and abutting one surface of said seal-tube to permit relative rocking motion between said one end of said seal tube and said armature and to seal the interior of said torque motor from fluids within said seal tube, the other end of said seal tube being attached in sealing relation to said torque motor frame.

2. The construction defined in claim 1 in which said resilient sealing means is disposed in a plane generally parallel to the support axis of said armature.

3. The construction defined in claim 1 in which said resilient sealing means is disposed in a plane generally parallel to and which includes the support axis of said armature.

4. The construction defined in claim 1 in which said resilient sealing means is disposed between said armature and the seal-tube.

5. The construction defined in claim 1 in which said resilient sealing tube means is disposed between said output member and said seal tube.

6. A fluid-seal construction for a torque motor having a frame, an armature and an output member secured to said armature, said armature and output member being supported in said frame for limited rocking movement about a predetermined axis, said fluid seal construction comprising, in combination a rigid seal-tube surrounding said output member and in closely-spaced relation thereto, means forming a recess in said armature at the armature support axis, one end of said seal tube extending into said recess and being in closely-spaced relation to the means forming said recess, the other end of said seal-tube being attached in sealing relation to said torque motor frame, and resilient sealing means located with the recess in said armature between said armature and a surface of said seal tube to permit relative rocking motion between said one end of said seal tube and said armature and to seal the interior of said torque motor from fluids within said seal tube, said resilient means lying in a plane generally parallel to and in a region close to the support axis of said armature.

7. The construction defined in claim 6 in which said resilient means lies in a plane that includes said armature support axis.

8. A fluid-seal construction for a torque motor having a frame, an armature and an output member secured to said armature, said armature and output member being supported in said frame for limited rocking movement about a predetermined axis, said fluid seal construction comprising, in combination a rigid seal-tube surrounding said output member and in closely-spaced relation thereto, one end of said seal tube extending toward said armature and terminating close to the armature support axis, the other end of said seal-tube being attached in sealing relation to said torque-motor frame, an annular channel within the seal-tube close to the end thereof adjacent the support axis for the armature, and a resilient seal within said channel intermediate the seal-tube and the output member.

9. A fluid-seal construction for a torque motor having a frame, an armature and output member assembly supported for limited rocking movement within the frame about a predetermined axis transverse to the armature and to the output member, a seal-tube surrounding the output member in spaced relation thereto, said seal-tube extending through the frame in fluid-tight relation thereto and terminating close to the support axis for the armature, the armature and output member assembly having a portion concentric with and closely adjacent the seal-tube, and a seal ring of resilient material between said seal-tube and the closely-adjacent concentric portion of the armature and output member assembly said seal ring permitting relative rocking movement between the end of said seal tube close to the support axis of said armature and said armature and output member assembly.

References Cited

UNITED STATES PATENTS

| | | | |
|---|---|---|---|
| 2,962,611 | 11/1960 | Atchley | 310—29 |
| 3,171,334 | 3/1965 | Rasmussen | 277—188 X |
| 3,238,398 | 3/1966 | Trbovich et al. | 310—29 |

MILTON O. HIRSHFIELD, *Primary Examiner.*

D. F. DUGGAN, *Assistant Examiner.*